No. 776,145. PATENTED NOV. 29, 1904.
C. V. POTTER.
PROCESS OF SEPARATING METALS FROM SULFID ORES.
APPLICATION FILED JAN. 14, 1902.
NO MODEL.
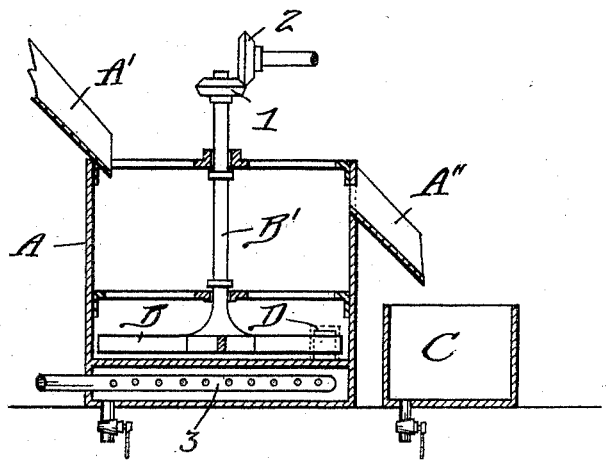
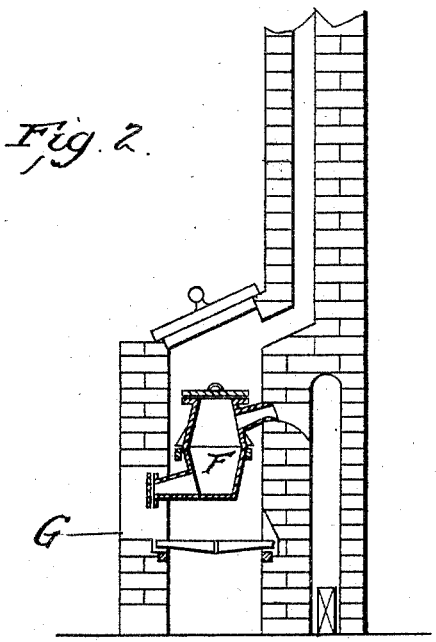

No. 776,145. Patented November 29, 1904.

UNITED STATES PATENT OFFICE.

CHARLES VINCENT POTTER, OF BALACLAVA, VICTORIA, AUSTRALIA.

PROCESS OF SEPARATING METALS FROM SULFID ORES.

SPECIFICATION forming part of Letters Patent No. 776,145, dated November 29, 1904.

Application filed January 14, 1902. Serial No. 89,772. (No specimens.)

*To all whom it may concern:*

Be it known that I, CHARLES VINCENT POTTER, engineer, a British subject, and a resident of 43 The Avenue, Balaclava, in the State of Victoria, Commonwealth of Australia, have invented an Improved Process of Separating Metals from Sulfid Ores, of which the following is a specification.

The object of my invention is to separate metals from sulfid ores by an expeditious, effective, and inexpensive means and method.

The crude ore, concentrates, tailings, or slimes after being pulverized are placed in a suitable vat or vessel and a solution is then added, such solution consisting of water with the addition of from one per cent. to ten per cent. of any acid, (preferably sulfuric acid, for reasons hereinafter stated,) the acidulated strength of the solution being determined by the quality or nature of the sulfid ore to be treated. The small quantity of acid added does not act as a solvent.

Ores containing lead, zinc, copper, iron, gold, and silver in combination with sulfur I treat as follows: The ore in a state of fine division is placed in a vat or such like vessel provided with an internal stirrer or stirrers. The acidulated solution is then added thereto, such solution containing in the first instance, say, one per cent. only of the acid when mixing it with the ores, and after heat is applied thereto, as hereinafter directed, gradually increasing its acidulated strength until the determinate strength is reached, which in most instances will amount to two and a half per cent. of acid, or thereabout, to be decided on or governed by the apparent action of the solution on the material under treatment. Heat being applied, the effect of the acidulated solution becomes apparent by the bubbling up and gathering on the surface of the fluid of the metallic concentrates in the form of a pasty mass. Should this pasty substance be scanty, thin, and not swell and accumulate rapidly, so as to overflow the vat if not skimmed off, more acid must be added until the maximum separative activity is reached, which very slight experience and observation in applying this treatment to sulfid ores will enable the operator to determine. I use sulfuric acid preferably by reason of its cheapness and its capability of production from a by-product resulting from the process or treatment herein described. While the exact acidulated strength of such solution will depend on the metallic contents and general condition of the ore, ascertainable only by observation when under treatment as aforesaid, any variation of the acidulated strength found necessary or expedient will remain well within the limit before stated—namely, of from one to ten per cent. of the whole solution. The bulk solution to be added or applied to the class of ores lastly named would be, say, approximately two hundred and fifty gallons to every ton weight of ore, varying to some small extent, according to the absorbent quality of the ore and its degree of fineness. The stirrers are then freely used, and heat is applied to the vat or vessel directly or by means of steam injection therein at or near the floor of the vat or vessel. As the temperature of the solution and other contents of the vat or vessel rises it causes the metals to rise upward from the bottom of the vat and float upon the surface, from which it may be allowed to flow automatically and continuously into a separate receptacle or be skimmed off, as arranged, into a separate vessel for further treatment. The gangue accumulating in the bottom of the separating-vat, containing a small proportion of gold and silver, as well as all the rhodonite, garnets, silica, and the like, can be then further treated by cyanid or other of the well-known means or processes and the gold and silver be thus extracted therefrom. The said solution may be used over and over again by the addition from time to time of a small quantity of acid when it is apparent by the effect of the solution when reapplied to the material and heated that its acidulated strength has become diminished. The skimmings or concentrates, containing all the metals free from gangue, are then mixed with a certain quantity of crushed or coarsely broken-up iron or iron oxid, (the quantity of such iron required depending upon the quantity of sulfur the metals contain,) also a quantity of powdered charcoal. This mixture is then placed in a suitable vessel or retort and a rapidly-produced heat applied, converting the mixture into a molten condition. After a short period it will be found that the sulfid of lead and silver has been reduced to metallic lead and silver. The retort can then be tapped at the bottom and these metals run off. In this step the iron changes places with the lead of the galena, the equation being Pbs+Fe=Fe.S+Pb. It will thus take fifty-six pounds of cast-iron to reduce two hundred and thirty-nine pounds of galena to two hundred and seven pounds of metallic lead. While this reduction is taking place the iron, having changed places with the lead, becomes sulfid of iron, and the zinc by the action of the great heat is vaporized and passed off in the form of vapor into a suitable vessel, wherein it becomes condensed into metallic zinc. The iron sulfid remaining in the retort is recrushed and roasted, the sulfur resulting from which may be utilized for the manufacture of sulfuric acid.

The means or process for treating ores, chiefly for the recovery of the gold therein, in combination with sulfur, such as iron pyrites or arsenical pyrites, is as follows: The ore is ground to a very fine powder, (the finer the better,) placed in a vat or suitable vessel, the said solution added, well stirred, and the heat applied in exactly the same manner as before described in relation to the lead and silver ores, thus separating the gold and other metals from the gangue in manner as before described. The skimmings or concentrates, which are now in a very small bulk containing practically all the gold, are then roasted in a suitable furnace, after which they will be in a condition to be treated by chlorin or cyanid in the well-known manner. By this treatment the difficulties of treating a large bulk of ores mixed with slimes and the necessity for dealing with the slimes by filtration are obviated and dispensed with and a better and more complete result obtained.

The accompanying drawings show, for example, a series of receptacles for carrying out the above-described process, in which—

Figure 1 is a sectional elevation of a vat and the tank, and Fig. 2 is a like view of the retort with its furnace.

In the drawings, A is the vat, having the chute A' leading thereto, and B indicates the stirrer-arms, secured to a shaft B', the stirrer-arms being rotated by means of the gearing 1 2 from a suitable source of power. The vat is shown as being heated by a gas-pipe 3, placed below the bottom of the vat. D is a door in the vat.

C indicates the separate tank, and A'' the chute for allowing the skimmings to flow from vat A to said tank C.

Fig. 2 shows the retort F placed in the furnace G, so as to be heated thereby.

Having now described my invention, what I claim as new, and desire to secure by Letters Patent, is—

1. The herein-described process of separating metals from pulverized sulfid ores which consists in adding to the same an acid solution which is a non-solvent of the precious metals, then applying heat to the same, and removing the sulfids from the surface of the solution, substantially as described.

2. The process of separating metals from pulverized sulfid ores, concentrates, and slimes by mixing an acidulated solution therewith which is a non-solvent of the metal to be separated, stirring, heating, skimming or floating off such metals from the surface of the whole admixture as they are carried to the surface so as to recover such concentrates of metals ready for after treatment, as, and in manner hereinbefore described.

3. The method of separating sulfid ores from their gangue, which consists in forming a suitable solution containing sulfuric acid to react on the soluble sulfids present to form bubbles of sulfureted hydrogen on the ore particles and thereby raise them to the surface, and removing the ore particles so raised, substantially as described.

In witness whereof I have hereunto set my hand in presence of two witnesses.

CHARLES VINCENT POTTER.

Witnesses:
ALFRED FORD,
JONATHAN BEAR.